United States Patent [19]
Edholm

[11] 3,723,828
[45] Mar. 27, 1973

[54] COUPLING MEANS FOR ELECTRIC INCINERATOR LAVATORIES

[76] Inventor: Sven Olof Edholm, Villavagen 27, Vadstena, Sweden

[22] Filed: July 23, 1971

[21] Appl. No.: 165,036

[52] U.S. Cl. .............................. 317/141 R, 307/141
[51] Int. Cl. ............................................. H01h 47/18
[58] Field of Search ................... 317/141 R; 307/141

[56]  References Cited

UNITED STATES PATENTS 3,244,899   4/1966   Merle ............................... 317/141 R
3,540,026   11/1970  Scott ................................. 317/141 R Primary Examiner—James D. Trammell
Attorney—Young & Thompson

[57] ABSTRACT

The present invention relates to coupling means for an incinerator chamber in electric incinerator lavatories, said chamber being heated by an electric element. Said means comprise a first relay, provided with a coil, between the terminals of a current source and a fan motor, and a second relay, with a coil, between the terminals of the current source and the electric element. The invention is chiefly characterized by a parallel circuit containing, in one branch, a closed contact in a repeating time relay in series with the coil of the second relay, and in the other branch, one switch which is in series with the coil of the time relay and is coupled between the terminals of the current source in series with a second switch which is mechanically coupled to the first switch, said second switch breaking when the first switch closes, and vice versa.

8 Claims, 2 Drawing Figures

Patented March 27, 1973

3,723,828

COUPLING MEANS FOR ELECTRIC INCINERATOR LAVATORIES

The present invention relates to coupling means for an incinerator chamber in electric incinerator lavatories, said chamber being heated by an electric element. Said means comprises a first relay provided with a coil, between the terminals of a current source and a fan motor, and a second relay with a coil, between the terminals of the current source and the electric element.

The invention aims at producing coupling means which allow for continuous use of the electric incinerator lavatory for which it is intended, regardless of the length of time between a number of flushings into the lavatory's incinerator chamber.

This is attained according to the invention by having a parallel circuit containing, in one branch, a closed contact in a repeating time relay in series with the coil of the second relay, and in the other branch, one switch which is in series with the coil of the time relay and is coupled between the terminals of the current source in series with a second switch which is mechanically coupled to the first switch, said second switch breaking when the first switch closes, and vice versa.

The invention will now be described in more detail below with reference to the enclosed drawing.

Figure 1A:
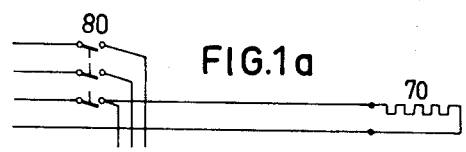
Figure 1B:
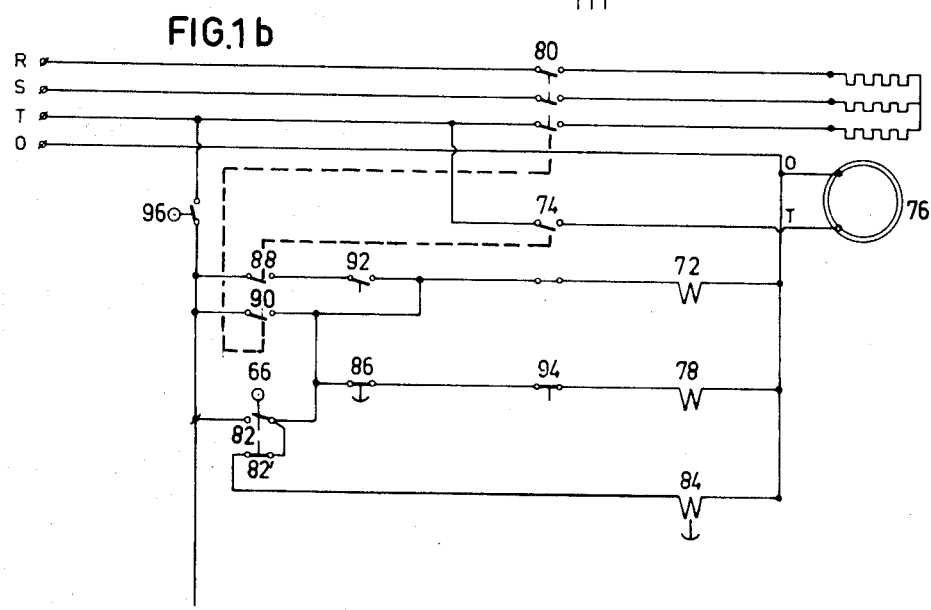

The coupling means according to the invention can be used in an electric incinerator lavatory of the type described in the U.S. Pat. application Ser. No. 9366. The element 70 provided to heat the incinerator chamber of the lavatory is, according to FIG. 1a in the drawing, e.g., connectable between a phase conductor and the zero conductor of a three phase network, or according to FIG. 1b, connected in star connection to all three phase conductors in a three phase network. The coupling gear comprises a first relay, with a coil 72, having contacts 74, lying in series with a fan motor 76, between the zero conductor and a phase conductor in a three phase network. The fan motor 76 is designed to drive a fan which expels the combustion gases from the incinerator chamber. A second relay, with a coil 78, is further provided and has three contacts 80 between the terminals of the current source and the electric element 70.

According to the invention, a switch 82, in series with a parallel circuit, is provided between a phase conductor and the zero conductor of the current source. One branch of the parallel circuit comprises a switch 82' which is mechanically coupled with the switch 82 and is in series with a time relay coil 84. The other branch of said parallel circuit includes contacts 86 in a time relay in series with the coil 78. The coil 72 is coupled between the zero conductor and the same phase conductor in series with contacts 88 in the relay for the fan motor 76. Parallel with the contacts 88 are contacts 90 connected in the relay for the element 70. Both contacts 88 and 90 are parallel coupled, as well, with the switch 82. Thermostat contacts 92, connected above the contact 90, series with the contact 88, and contact 94, coupled overheat protection, in series with the time relay contacts 86 and the coil 78.

When emptying the insert into the incinerator chamber, the switch 66 is actuated by the doors to the incinerator chamber so that the switch 82 is closed and the switch 82' is opened. In this way, the coil 72 receives current to close the contacts 74 and start the fan motor 76. At the same time, the coil 78 is provided with current via the closed contacts 86 and 94 so that the contacts 80 are closed and the element 70 receives current.

The above mentioned switch 66 may be arranged so that it is again controlled when the doors to the incinerator chamber of the electric incinerator lavatory are closed, so that the switch 82 is again opened and the switch 82' is closed. The coils 72 and 78 thereby are supplied with holding current via the contacts 90 which were closed when the coil 78 received current. The coil 84 further receives current by the closing of the switch 82' and the time relay begins to operate. This time relay can be set to approximately 30 minutes. When a certain temperature is reached, the thermostat contacts 92 are closed and thereby take over the operation of the fan motor 76. When the time relay contacts 86 are opened after approximately 30 minutes, the coil 78 loses all its current so that the contacts 80 and 90 are opened and the element 70 cools down. However, the fan continues to run since the thermostat contacts 92 are closed. Said contacts open only when the temperature in the incinerator chamber falls to 50°C, at which time the fan also stops.

If the lavatory should be used again during the incinerating period, when the element 70 and the fan motor are on, the current to the time relay coil 84 is broken by the opening of the switch 82' caused by the actuating of the switch 66 when the doors of the incinerator chamber are opened for flushing. According to an excellent feature of the invention, the time relay has a repetitive function in that, when the switch 82' is reclosed by the shutting of the incinerator chamber doors, said time relay starts again from the beginning and a further 30 minute incinerating period is started. During the new emptying period, the fan motor continues to operate by means of the thermostat contacts 92. If a number of successive emptyings into the incinerator chamber should occur, a 30 minute time period will always be made available for the incinerating. This feature allows the lavatory to be continuously used, in contrast with other known lavatories which are equipped solely with thermostats that follow the temperature in the incinerator chamber. With these known lavatories, another emptying cannot occur before the thermostat has reached an upper temperature limit, as a rule after 25 to 30 minutes.

The protection contacts 94 break the current to the coil 78, if the temperature in the incinerator chamber should become too high. There are further protection contacts 96 on an ash box which is provided under the incinerator chamber. Said contacts 96 break the current supply of the entire circuit, described above, when the ash box is withdrawn.

I claim:

1. A control circuit for an incinerator toilet having an incinerator chamber into which sewage is introduced through a chamber closure and in which such sewage is incinerated by an electrical heater unit comprising a power source, a fan motor, a time delay relay means having a time relay coil and normally closed time relay contacts, said time delay relay means having a repetitive function and operating upon each energization of said time relay coil after deenergization thereof to open said normally closed time relay contacts upon the expiration of a single time period after said time relay coil energization, first circuit means connectable between said power source and said fan motor for energizing said fan motor, second circuit means connectable between said power source and said electrical heater unit for energizing said electrical heater unit, said second circuit means including first relay means having first relay contacts connected between said power source and heater unit and a first relay coil for operating said first relay contacts connected in series with said normally closed time relay contacts, and interconnected control switch means operative to energize said control circuit, said control switch means including a first switch means for selectively completing and breaking a circuit from said power source to said first and second circuit means and second switch means for selectively completing and breaking a circuit from said power source to said time relay coil, said first and second switch means being interconnected whereby one of said first and second switch means breaks a circuit when the other completes a circuit.

2. The control circuit of claim 1 wherein said second circuit means includes first holding relay contact means connected in parallel with said first switch means between said power source and said normally closed time relay contacts, said first holding relay contact means being closed upon energization of said first relay coil by completion of a circuit to said power source by said first switch means to maintain energization of said first relay coil upon the breaking of the circuit to said power source by said first switch means.

3. The control circuit of claim 2 wherein said normally closed time delay relay contacts open to deenergize said first relay coil only after the expiration of said single time period after the energization of said time relay coil by said second switch means.

4. The control circuit of claim 3 wherein said second circuit means includes overheat switch means, said overheat switch means operating to deenergize said first relay coil when said incinerator chamber reaches an overheat temperature.

5. The control circuit of claim 2 wherein said first circuit means includes a second relay means having second relay contacts connected between said power source and fan motor and a second relay coil for operating said second relay contacts, and a second holding relay contact means connected in parallel with said first switch means between said power source and said second relay coil, said second holding relay contact means being closed upon energization of said second relay coil by completion of a circuit to said power source by said first switch means to maintain energization of said second relay coil upon the breaking of the circuit to said power source by said first switch means.

6. The control circuit of claim 5 wherein said first circuit means includes thermostatic switch means connected in series with said second holding relay contact means and second relay coil, said thermostatic switch means operating to close the circuit to said second relay coil when the incinerator chamber temperature is above a switch operating temperature and to open the circuit to said second relay coil when the incinerator chamber temperature is below the switch operating temperature.

7. The control circuit of claim 6 wherein said first switch means is closed by the opening of said chamber closure while said second switch means is opened and said first switch means is opened by the closing of said chamber closure while said second switch means is closed.

8. The control circuit of claim 6 wherein said thermostatic switch means and second holding relay contact means are connected in parallel to form a parallel circuit connected to said power supply, said second switch means being connected to receive energization from said power supply via either branch of said parallel circuit.

* * * * *